(12) United States Patent
Darling

(10) Patent No.: US 11,446,777 B2
(45) Date of Patent: Sep. 20, 2022

(54) PORTABLE CUTTING TABLE WITH IMPROVED FOLDING LEG ASSEMBLIES

(71) Applicant: Dennis Alan Darling, Manakin-Sabot, VA (US)

(72) Inventor: Dennis Alan Darling, Manakin-Sabot, VA (US)

( * ) Notice: Subject to any disclaimer, the term of this patent is extended or adjusted under 35 U.S.C. 154(b) by 195 days.

(21) Appl. No.: 16/974,135

(22) Filed: Oct. 15, 2020

(65) Prior Publication Data
US 2022/0118567 A1 Apr. 21, 2022

(51) Int. Cl.
*B23Q 1/03* (2006.01)
*A47B 37/00* (2006.01)
*A47B 1/05* (2006.01)
*A47B 3/08* (2006.01)
*A47B 13/08* (2006.01)

(52) U.S. Cl.
CPC .................. *B23Q 1/03* (2013.01); *A47B 1/05* (2013.01); *A47B 3/08* (2013.01); *A47B 13/083* (2013.01); *A47B 37/00* (2013.01)

(58) Field of Classification Search
CPC .... B23Q 1/03; A47B 1/05; A47B 3/08; A47B 13/083; A47B 37/00
See application file for complete search history.

(56) References Cited

U.S. PATENT DOCUMENTS

| | | | | |
|---|---|---|---|---|
| 4,383,488 A | * | 5/1983 | Macho | A47B 3/08 108/130 |
| 7,503,267 B1 | * | 3/2009 | Zemel | A47B 3/08 108/115 |
| 8,528,489 B2 | * | 9/2013 | Roy | A47B 3/06 108/125 |
| 10,858,848 B2 | * | 12/2020 | Woodward | E04G 1/34 |
| 11,168,832 B2 | * | 11/2021 | Carter, Sr. | F16M 11/16 |
| 2018/0333838 A1 | * | 11/2018 | Cindric | A47B 3/08 |

FOREIGN PATENT DOCUMENTS

DE 202019001978 U1 * 8/2019

* cited by examiner

*Primary Examiner* — Daniel J Rohrhoff

(57) ABSTRACT

A portable cutting table including a top having an upper portion and a lower portion and a table skirt secured to the lower portion of the top. The table includes folding leg assemblies, each having a pair of support legs. Each leg has a distal end defining a bevel having a predetermined angle, and a proximal end defining a compound curve including at least a first curve with a first radius of curvature and a second curve with a second radius of curvature. The first curve defines a notch in an outer face of the leg corresponding to the predetermined angle. The second curve has a midpoint and a center of curvature so the proximal end of each leg defines a pivot point located at least halfway between the midpoint and the center of curvature. Each support leg is pivotably connected at the pivot point to the table skirt.

9 Claims, 6 Drawing Sheets

PORTABLE CUTTING TABLE WITH IMPROVED FOLDING LEG ASSEMBLIES

FIELD OF THE INVENTION

The present invention relates generally to portable tables and, more particularly, to a portable table having folding leg assemblies.

BACKGROUND

Many types of portable tables are described in catalogs and various patents. These tables are lightweight, often weighing only a few pounds, and have folding leg mechanisms designed for compact storage. Exemplary recent embodiments of these tables include complex pivoting leg assemblies such as described at, for example, U.S. Pat. No. 9,713,375 issued to Rahm. Other recent embodiments of portable tables have multi-fold mechanisms with complex hinge assemblies such as described at, for example, U.S. Pat. No. 7,278,361 issued to Zhurong et al. Other embodiments of portable tables employ casters or rollers and a slidable top such as described at U.S. Pat. No. 947,115 issued to Mercer. Examples of portable tables include embodiments that can be anchored to an earthen surface utilizing a spike such as described at U.S. Pat. No. 6,705,240 issued to Block et al.

These tables are generally unsuitable for uses requiring a relatively small, stable and robust surface at a convenient height (e.g., from about 28 to about 36 inches) such as, for example, cutting and preparing meats, vegetables and the like for cooking at events like barbeques, cooking competitions, outdoor gatherings, garden parties, tailgate events, or similar outdoor venues and/or indoor venues. There is an unmet need for a portable table providing a stable and robust surface at a convenient height for cutting and preparing meats, vegetables and the like for cooking at various venues. There is also an unmet need for a robust portable table that is economical and easy to manufacture. There is also an unmet need for a robust portable table that is economical and easy to manufacture from readily available and renewable materials such as wood, wood composites, and/or repurposed wood products.

SUMMARY

The problems described above are addressed by the present invention which encompasses a portable cutting table (which may be referred to hereinafter as "the table" or "the portable table" for convenience). The table includes a top (i.e., a top configured for cutting which may be called a "cutting top") having an upper portion and a lower portion, a first end and a second end, and at least one edge. The table also includes a table skirt secured to the lower portion of the top adjacent the at least one edge of the top. In an aspect of the invention, the cutting top may be from about 4 square feet to about 8 square feet in area. Desirably from about 5 square feet to about 7 square feet in area, and even more desirably, about 6 square feet in area.

The portable cutting table also includes improved folding leg assemblies. That is, the table includes a first leg assembly and a second leg assembly. Each leg assembly includes a pair of support legs. Each support leg has an outer face and an opposed inner face, a first side and an opposed second side, the first side and second side each being generally perpendicular to the outer face and inner face. According to the invention, each leg includes a distal end defining a bevel having a predetermined angle, and a proximal end defining a compound curve including at least a first curve with a first radius of curvature and a second curve with a second radius of curvature.

A feature of the first curve is that it defines a notch in the outer face of the support leg substantially corresponding to the predetermined angle of the bevel. A feature of the second curve is that it has a midpoint and a center of curvature such that the proximal end of each support leg defines a pivot point located at least halfway between the midpoint and the center of curvature. For example, the pivot point may be located halfway between the midpoint and the center of curvature or the pivot point may be located closer to the midpoint than the center of curvature.

Each support leg of the first leg assembly is pivotably connected at the pivot point to the table skirt near the top first end and each support leg of the second leg assembly being pivotably connected at the pivot point to the table skirt near the top second end. The pivotable connection may be carried out with mechanical fasteners such as, for example, bolts, screws, dowel rods, pins or the like.

According to the invention, the table has a storage position in which the first leg assembly and the second leg assembly nest together against the lower portion of the top when the leg assemblies are folded in the storage position. The table also has a deployed position in which the first leg assembly and the second leg assembly deploy to an angle relative to the top that is approximately the sum of ninety degrees and the predetermined angle when the leg assemblies are extended in the deployed position.

In an aspect of the invention, the first leg assembly and the second leg assembly may each include a connecting brace. In this configuration, the second leg assembly desirably includes notches on its outer face to receive the connecting brace of the first leg assembly when the table is in the storage position.

In an embodiment of the invention, the table skirt may include a pull-out element secured to the lower portion of the top. This pull-out element may be a pull-out shelf, a wire basket, a frame for holding a container or bag, or the like.

In another aspect of the invention, the table skirt may define a first side element and a second side element extending between the first end and the second end of the top. The first side element and the second side element may be secured to the lower portion of the top adjacent the at least one edge of the top. Each side element may include hardware that extends beyond the at least one edge of the top. For example, each side element may include mounted hardware in the form of handles, bottle openers, knobs or hooks that extend from about 0.25 inches to 1.5 inches beyond the edge of the top. Desirably, these mounted hardware components provide separation between the edge of the top and any generally flat surface the table is resting on when the table is placed on its side.

The present invention also includes a method of making a portable cutting table. This Method includes at least the following several steps: providing a top including an upper portion and a lower portion, a first end and a second end, and at least one edge; providing a table skirt and securing the table skirt to the lower portion of the top adjacent the at least one edge of the top; providing a first pair and a second pair of supports leg, each support leg having an outer face and an opposed inner face, a first side and an opposed second side, the first side and second side each being generally perpendicular to the outer face and inner face, a distal end, and a proximal end; defining a bevel having a predetermined angle on the distal end of each support leg; defining a compound curve including at least a first curve with a first radius of curvature and a second curve with a second radius of curvature on the proximal end of each support leg such that (i) the first curve defines a notch in the outer face of the support leg substantially corresponding to the predetermined angle of the bevel, and (ii) the second curve has a midpoint and a center of curvature such that the proximal end of each support leg defines a pivot point located at least halfway between the midpoint and the center of curvature; forming a first leg assembly using the first pair of support legs and a connecting brace and forming a second leg assembly using the second pair of support legs and a connecting brace; and pivotably connecting each support leg of the first leg assembly at its pivot point to the table skirt near the top first end and pivotably connecting each support leg of the second leg assembly at its pivot point to the table skirt near the top second end.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Invention with reference to the accompanying drawing figures, in which like reference numerals denote similar structure and refer to like elements throughout, and in which.

DETAILED DESCRIPTION

In describing the various embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
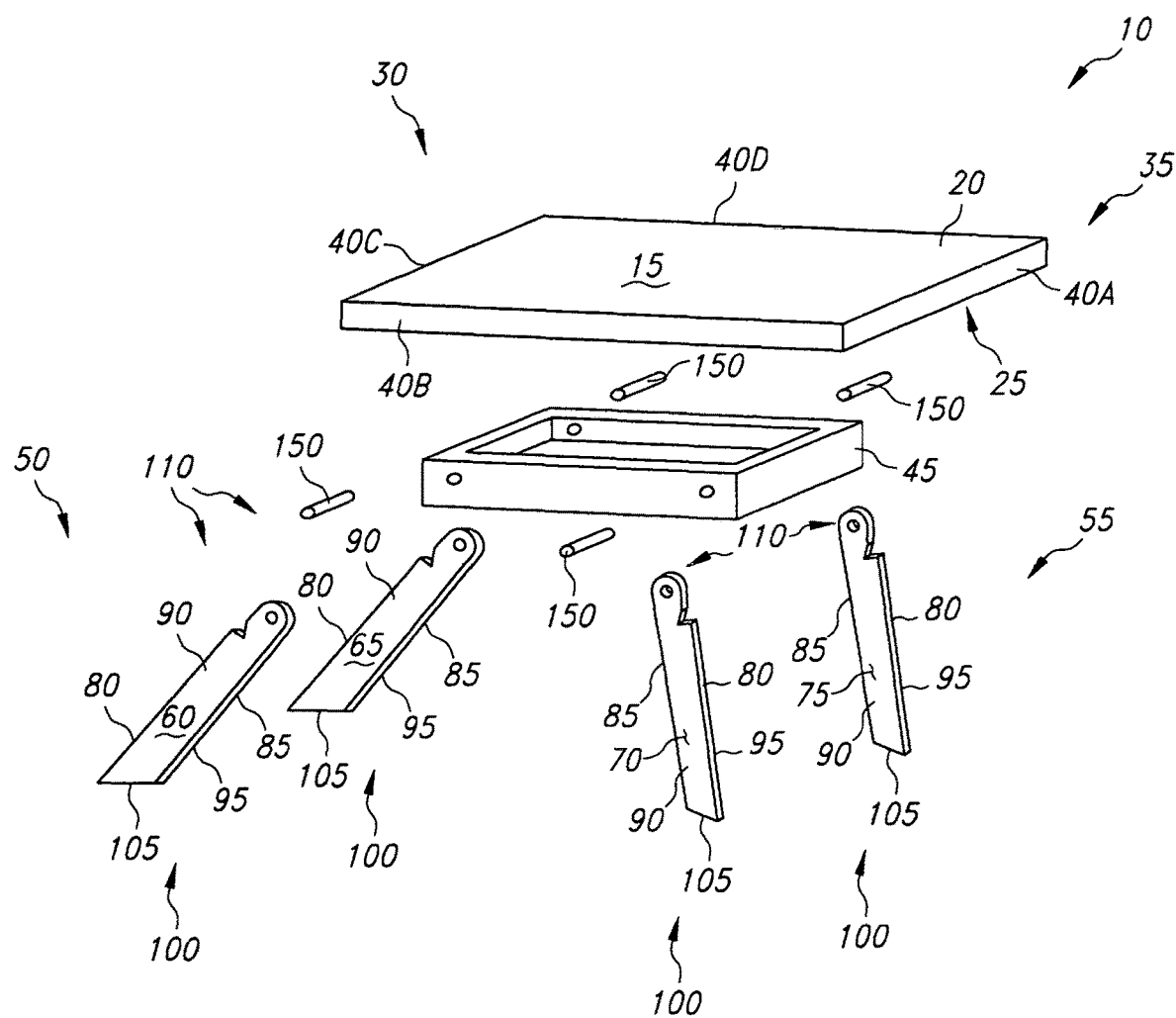
FIG. 1 is an exploded perspective view of an exemplary embodiment of a portable cutting table according to the present invention.

The present invention is directed to a portable cutting table 10 as show in exploded perspective view in FIG. 1

The portable cutting table 10 includes a top 15. The top 15 is desirably formed of a dense material suitable for cutting, chopping, or preparing food (which may be defined as a "cutting top"). When such materials are used to form a top of sufficient area for cutting, chopping, or preparing food (e.g., a rectangle or square from about 4 square feet to about 8 square feet in area, desirably from about 5 square feet to about 7 square feet in area, and even more desirably, about 6 square feet in area) the top may be relatively heavy. Exemplary materials include plastic materials of the type used for cutting boards, wood laminates such as those commonly referred to as "butcher block", recycled laminate or composite materials such as, for example, repurposed wood bowling alley lane, repurposed bowling alley lane separator or the like. It is also contemplated that the top may be a laminated material including layers such as, for example, plywood, boards, bamboo, plastic or the like in combination with a dense material suitable for cutting or preparing food. The top 15 includes an upper portion 20 and a lower portion 25, a first end 30 and a second end 35, and at least one edge 40. For example, the top may be circular or oval and have what may be described as a single edge. Alternatively, the top may be triangular and have three edges. As yet another alternative and as shown in FIG. 1, the top 15 may be square or rectangular and have four edges, namely 40A, 40B, 40C and 40D. It is contemplated that the top may be pentagonal, hexagonal, etc. and have a corresponding number of edges.

The portable table 10 includes a table skirt 45 secured to the lower portion 25 of the top 15 adjacent the at least one edge 40 of the top. For example, as show in FIG. 1, the table skirt 45 of the rectangular top 15 is secured to the lower portion 25 along four edges —40A, 40B, 40C and 40D. It is contemplated that the table skirt 45 may form a unitary structure as shown in FIG. 1. Alternatively, the table skirt 45 may be formed as discrete sections, each section separately secured to the lower portion 25 of the top 15.

According to the present invention, the portable table 10 includes a first leg assembly 50 and a second leg assembly 55, each leg assembly including a respective pair of support legs. That is, the first leg assembly 50 includes a support leg 60 and a support leg 65. The second leg assembly 55 includes a support leg 70 and a support leg 75.

Each support leg (60, 65, 70, and 75) has an outer face 80 and an opposed inner face 85, a first side 90 and an opposed second side 95. Generally speaking, the first side 90 and second side 95 each may be generally perpendicular to the outer face 80 and inner face 85. However, it is contemplated that each support may have alternative cross-sections including, but not limited to, circular, oval, triangular, pentagonal, hexagonal or the like. In such configurations, the support leg should have a compound curve as discussed below.

Each support leg (60, 65, 70, and 75) has a distal end 100 defining a bevel 105 having a predetermined angle 4). This predetermined angle 4) may range from about 5 degrees to about 20 degrees. For example, the predetermined angle 4) may range from about 8 degrees to about 17 degrees. Desirably, the predetermined angle 4) may be about 13 degrees. Desirably, the bevel 105 may extend from the outer face 80 to the inner face 85.

Figure 2:
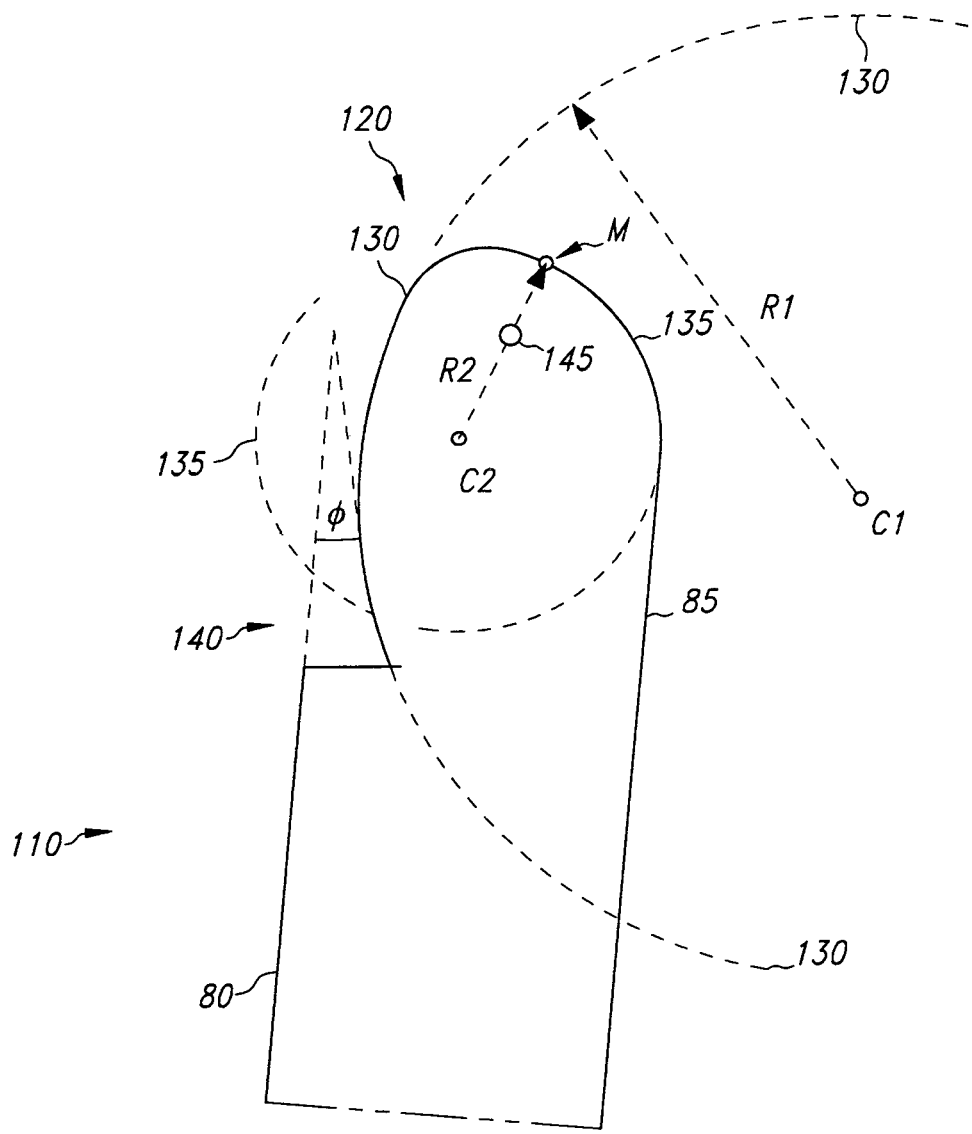
FIG. 2 is a side view of a detail of an exemplary embodiment of the present invention.
Figure 3:
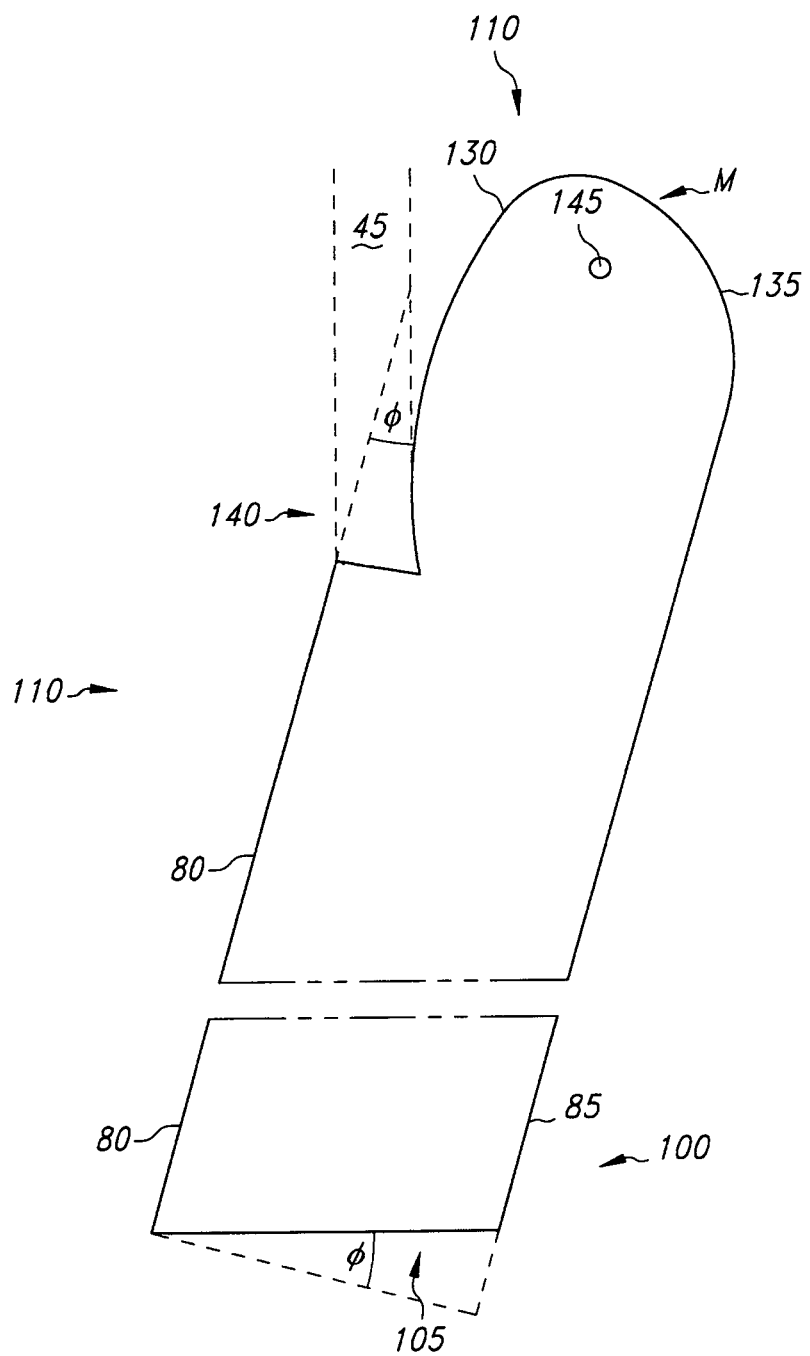
FIG. 3 is a side view of a detail of an exemplary embodiment of the present invention.

Each support leg (60, 65, 70, and 75) has a proximal end 110 defining a compound curve 120 as generally shown in side view at FIGS. 2 and 3. The compound curve 120 includes at least a first curve 130 with a radius of curvature "R1" and center of curvature "C1" a second curve 135 with a radius of curvature "R2" and center of curvature "C2". Each of these curves is identified in FIG. 2 as a curved surface at the proximal end of a support leg as well as with broken lines extending beyond its respective curved surface on the support leg to help highlight the details of the curve for a view of the figure. Another feature of the present invention that the first curve 130 defines a notch 140 in the outer face 80 of each support leg (60, 65, 70, and 75) substantially corresponding to the predetermined angle 4) of the bevel 105.

In addition to the center of curvature C2", the second curve 135 has a midpoint "M" located at the proximal end of the support leg along what may be described as a transition zone between the outer face 80 and the inner face 85. Each support leg (60, 65, 70, and 75) defines a pivot point 145. The pivot point 145 may be located at least about halfway between the midpoint "M" and the center of curvature "C2". For example, the pivot point 145 may be located halfway between the midpoint "M" and the center of curvature "C2" or the pivot point 145 may desirably be located closer to the midpoint "M" than the center of curvature "C2". That is, the pivot point 145 may be located at a position at least two-thirds or even three-quarters of the distance between the midpoint "M" and the center of curvature "C2" such that the pivot point is located much closer to the midpoint "M" than the center of curvature "C2".

Each support leg (60, 65) of the first leg assembly 50 is pivotably connected at its pivot point 145 to the table skirt 45 near the top first end 30 and each support leg (70, 75) of the second leg assembly 55 is pivotably connected at its pivot point 145 to the table skirt near the top second end 35. Locating the pivot point 145 at least halfway between the midpoint "M" and the center of curvature "C2" increases the length of each support leg by distance that is at least approximately one-half the distance between the midpoint "M" and the center of curvature "C2". It is generally thought that conventional table legs typically have a pivot point located at approximately the center of curvature which results in an effectively shorter table leg. While the additional support leg length provided by one aspect of the present invention may seem relatively small in comparison to the total length of a support leg, that advantage is amplified by a corresponding reduction in the length of the top (which is desirably made of a dense material that adds significant weight) as well as the length of the skirt. That is, conventional table legs are longer and require a correspondingly longer table top and skirt for the legs to fit.

While the inventor should not be held to any particular theory of operation, the use of a compound curve 120 allows for fast, reliable and reproducible production of the support legs when such legs are manufactured by a cutting operation such as, for example, bandsaw, jigsaw cutting or the like. Fast, reliable and reproducible production of support legs may be particularly important for batch production of the support legs in wood shop or small manufacturing settings.

In an aspect of the invention, the first curve 130 may have a radius of curvature R1 that is greater than the radius of curvature R2 of the second curve 135. For example, the radius of curvature R1 may range from about 1 to 4 times the radius of curvature R2. As another example, the radius of curvature R1 may range from about 2 to 3 times the radius of curvature R2. As yet another example, the radius of curvature R1 may be about 2.5 times the radius of curvature R2. For example, if the radius of curvature R1 is about 2.75 inches, the radius of curvature R2 may be about 1 inch for an exemplary support leg having dimensions of 1.5 inches by 3.5 inches (that is, the separation between the first side 90 and second side 95 may be about 1.5 inches and the separation between the outer face 80 and inner face 85 may be about 3.5 inches).

Additionally, and with reference to FIG. 3 of the drawings, the first curve 130 desirably has a center of curvature C1 such that the notch 140 defined in the outer face 80 of each support leg has sufficient depth to adequately engage the table skirt 45 to stabilize the table during use and to position each support leg for proper deployment during use (i.e., at an obtuse angle as discussed below). For example, the notch 140 may range in depth from about one-half inch to one and one-half-inch. Desirably, the notch 140 may have depth from about three-quarters of an inch to about one and one-quarter inch. As discussed further below, the table has a deployed position in which the leg assemblies are deployed at an angle greater than 90 degrees (e.g., in an obtuse angle in a range from about 95 degrees to about 115, desirably in a range of from about 98 degrees to 110 degrees, more desirably in a range from about 100 degrees to about 105 degrees) for greater table stability. Deploying legs in this manner (i.e., at an obtuse angle) with conventional table legs would require even more length to compensate for the non-perpendicular configuration (with respect to the top) in addition to the extra length needed to compensate for a pivot point conventionally positioned at the center of curvature. In contrast, the present invention allows for a relatively shorter support leg length which allows a reduction in the distance between the first end and the second end of the top. The shorter table top eliminates weight and expense, particularly when butcher block type composite materials or dense plastics are used for the top. A loss of stability due to a shorter top length may be offset by the stability provided by the obtuse angle of the deployed table legs. However, it is believed to be desirable to maintain the width of the top (i.e., to avoid narrowing the width of the top to reduce weight) as a way to help table stability.

It is believed that even small reductions in weight without sacrificing table stability are important because of the weight of the dense table top and, depending on the materials used, the table skirt and support legs. For example, a top having dimensions of 24 inches by 36 inches along with a wood skirt and wood support legs may have a weight ranging from about 25 to about 45 pounds. A cutting table weight in this range is believed to help provide stability when the table is properly set up (e.g., when the legs are deployed properly) while still being in a weight range that is considered relatively easy to move for an average adult human. Generally speaking, an assembled portable cutting table having a square or rectangular top with an area of from about 4 square feet to about 8 square feet may have a weight of from about 25 to about 45 pounds. Desirably, the assembled portable cutting table may have a square or rectangular top with an area of from about 5 square feet to about 7 square feet and a weight of from about 30 to about 40 pounds. Small reductions in weight (e.g., reductions of 1 to 5 pounds) may make a meaningful difference in portability and ease of use for an average person. It is also contemplated that the table skirt and/or the support legs may be manufactured from other materials such as, for example, aluminum, steel, or plastics. For example, the support legs may be formed from extruded aluminum with the compound curve formed on the distal end. It is also contemplated that the compound curve may be formed as a separate section (from the same material or from one or more different material) and joined to or integrated into or onto the support leg.

The pivotable connection may be accomplished by separate bolts 150 at each pivot point 145. It is contemplated that a first rod (not shown) may extend across a width of the table skirt to pivotably connect the support legs (60, 65) of the first leg assembly 50 and a second, separate rod (not shown) may extend across a width of the table skirt to pivotably connect the support legs (70, 75) of the second leg assembly 55.

Figure 4:
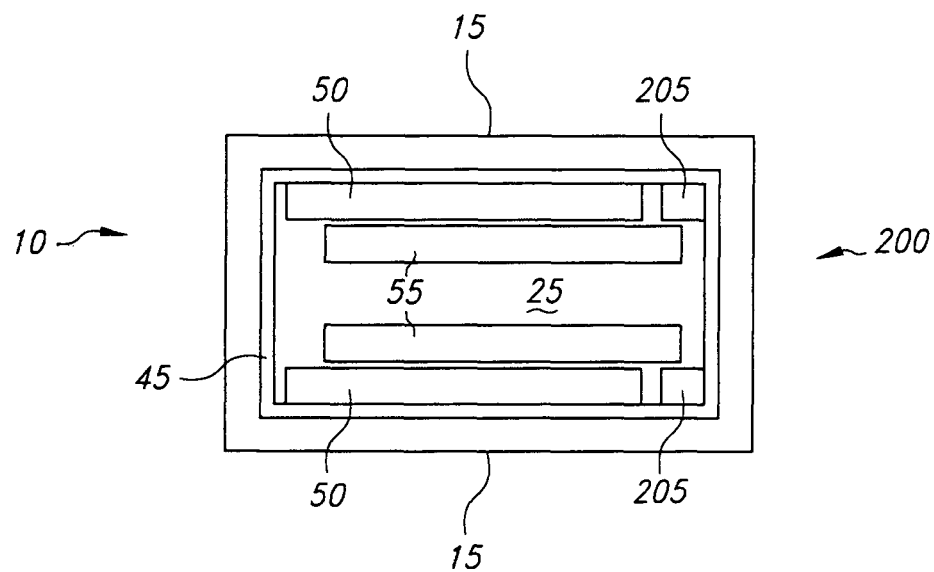
FIG. 4 is a top view of the embodiment illustrated in FIG. 1 in a storage position.
Figure 5:
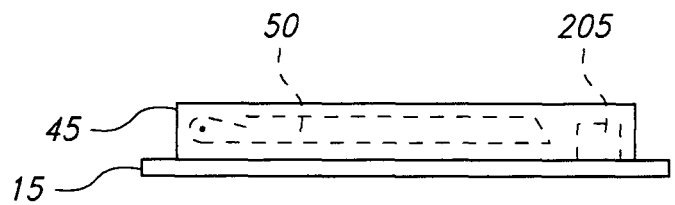
FIG. 5 is a side view of the embodiment illustrated in FIG. 4.

One aspect of the invention is that the table 10 has a storage position 200 as shown generally in FIG. 4 in plan view (not to scale) with the folded leg assemblies visible from above. As can be seen, the first leg assembly 50 and the second leg assembly 55 nest together against the lower portion 25 of the top 15 when the table is in the storage position. The first leg assembly 50 is secured directly to the table skirt 45. The second leg assembly 55 is secured indirectly to the table skirt 45 via a pair of spacers 205. The spacers 205 offset the position of the second leg assembly 55 so it can nest within the first leg assembly 50. It is noted that the illustration of FIG. 4 is not to scale because the legs and spacers as shown have thicknesses much greater than needed for ease of illustration. Referring now to FIG. 5 (showing a side view of the plan view of FIG. 4), the table 10 can be seen in its storage position 200 with the second leg assembly 55 (not shown) nested within the first leg assembly 50 (shown in broken lines) behind the table skirt 45.

Figure 6:
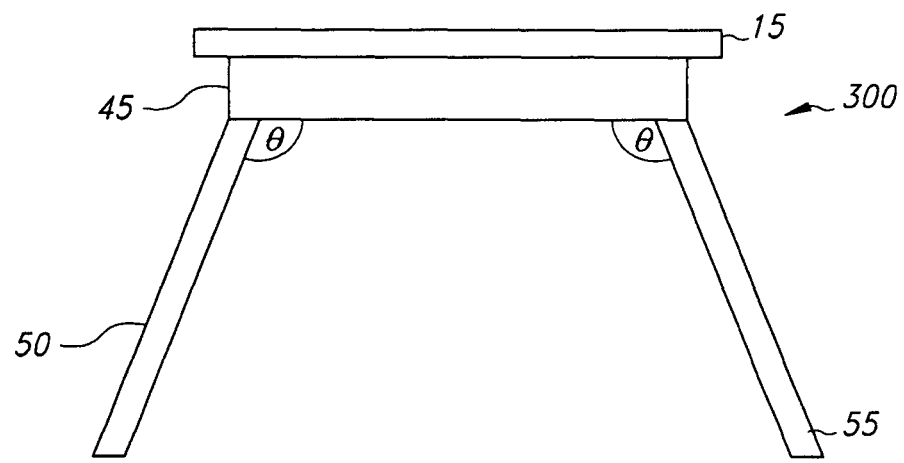
FIG. 6 is a side view of the embodiment illustrated in FIG. 1 in a deployed position.

As shown in side view by FIG. 6, the table 10 has a deployed position 300. In the deployed position, the first leg assembly and the second leg assembly deploy to the predetermined angle θ relative to the top that is approximately the sum of ninety degrees and the above-described predetermined angle ϕ (See FIGS. 2 and 3) when the table is in the deployed position. For example, when the predetermined angle ϕ is approximately 13 degrees, the predetermined angle θ is approximately 103 degrees.

Figure 7:
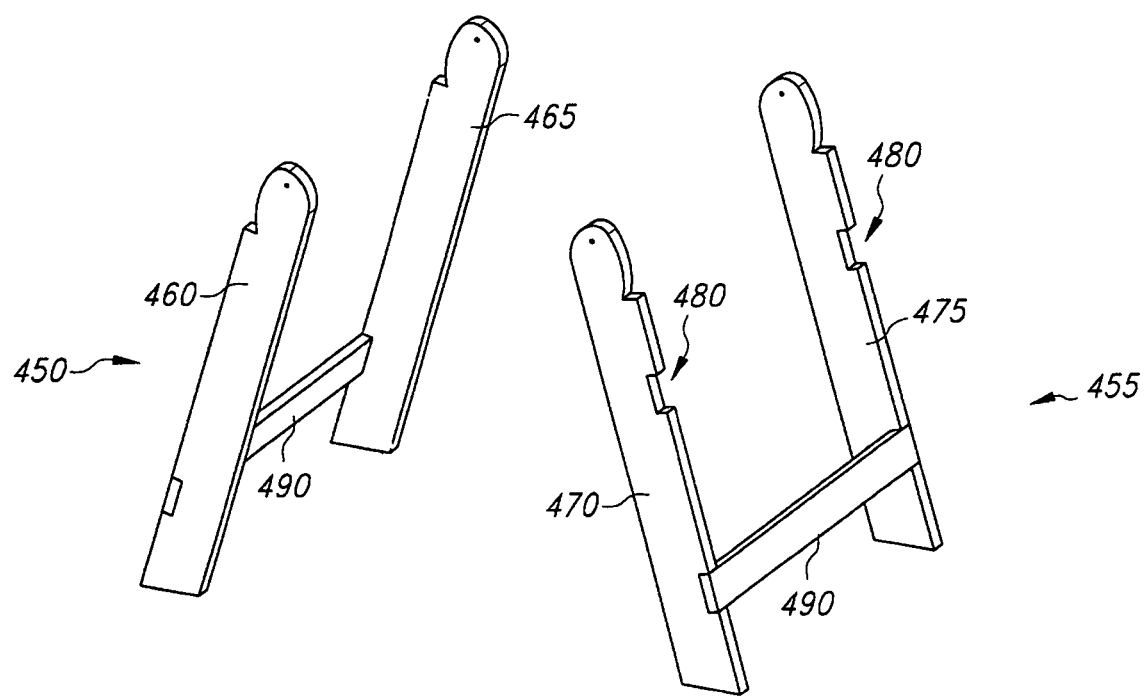
FIG. 7 is a perspective view of a detail of an exemplary embodiment of the present invention.

Referring now to FIG. 7 of the drawings, there is shown an exemplary alternative first leg assembly 450 (including support legs 460 and 465) and exemplary alternative second leg assembly 455 (including support legs 470 and 475) each include a connecting brace 490. The second leg assembly 455 includes notches 480 on its outer face to receive the connecting brace 490 of the first leg assembly 450 when the table is in the storage position.

According to an embodiment of the present invention, the table may include a pull-out element secured to the lower portion of the top. For example, the table skirt may include a recess or opening for a pull-out element attached to or mounted on one or more slide(s) secured to the lower portion of the top. As a non-limiting example, the pull-out element may be a pull-out shelf or pull-out shallow drawer attached to or mounted on one or more slide(s) secured to the lower portion of the top. Other configurations are contemplated including a pull-out frame for securing a pan, tray or a pull-out frame for securing a bag.

Figure 8:
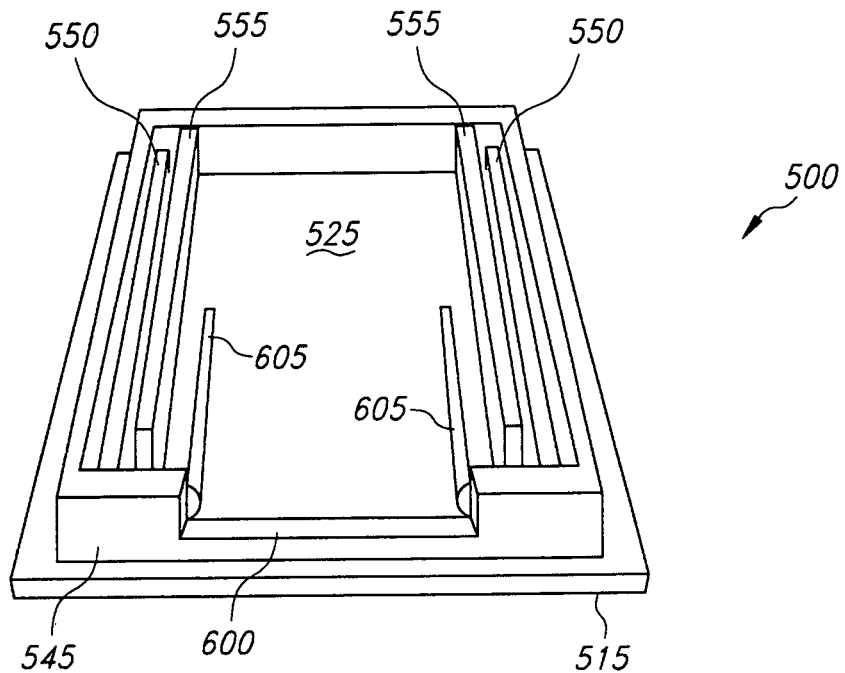
FIG. 8 is a bottom perspective view of a detail of a portion of an exemplary embodiment of the present invention.
Figure 9:
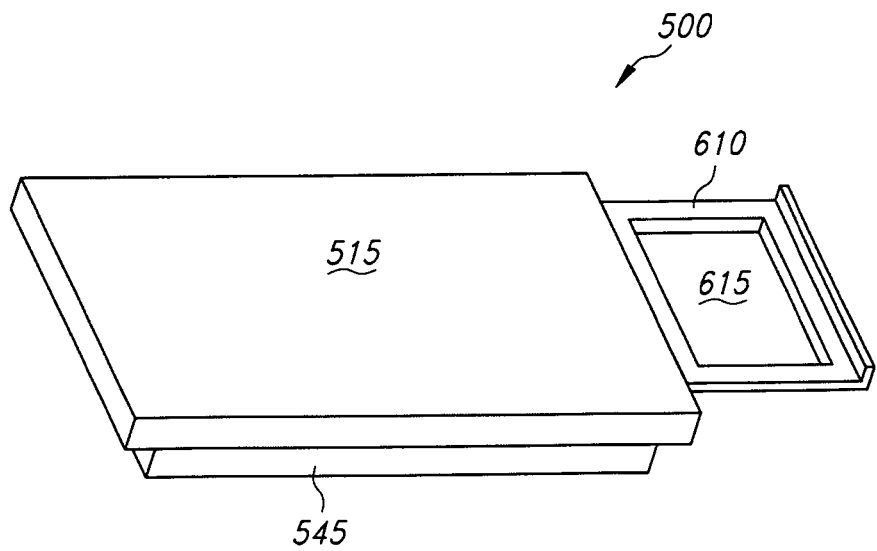
FIG. 9 is a top perspective view of a detail of a portion of an exemplary embodiment illustrated in FIG. 8.

Referring now to FIG. 8 of the drawings, there is shown a bottom perspective view of a portion of an exemplary portable table 500 having a top 515 and a skirt 545. The skirt defines a notch or recess 600 that is adapted to receive a pull-out element (not shown) that is mounted on slides 605 secured to the skirt and the bottom portion 525 of the top 515. As can be seen in FIG. 8, the slides are configured to nest between the support legs of the first leg assembly 550 and the second leg assembly 555. FIG. 9 is a top perspective view of a portion of the exemplary portable table 500 of in FIG. 8 illustrating a pull-out element 610. The pull-out element 610 may be in the form of a shelf or a frame defining an opening 615 that may be configured to receive a pan, bag, tray or the like. It is contemplated that wood braces, hardware, wires or mechanical fasteners may be used to secure the pan, bag, tray or the like which is advantageous the top is used for preparing food.

In an aspect of the invention, the table skirt may define a first side element and a second side element extending between the first end and the second end of the top. The first side element and the second side element may be secured to the lower portion of the top adjacent the at least one edge of the top. Each side element may include hardware or similar features that extend beyond the at least one edge of the top. For example, one side element may include a mounted handle that extends beyond the edge of the top by at about 0.5 inch and the opposite side element may include a mounted bottle opener and knob—each extending beyond the edge by about 0.5 inch. Of course, the hardware may be mounted to extend beyond the edge by other distances including, but not limited, to 0.25-inch, 0.75-inch, 1 inch, or 1.5 inch. The separation provided by the mounted hardware keeps the edge of the top from resting on the ground when the table is set on its side to move the leg assemblies into a deployed position.

The present invention also includes a method of making a table. The method includes providing a top including an upper portion and a lower portion, a first end and a second end, and at least one edge. Ideally, the top is a wood laminate such as those commonly referred to as "butcher block", recycled laminate or composite materials such as repurposed wood bowling alley lane surfaces suitable for cutting or preparing food.

The method includes providing a table skirt and securing the table skirt to the lower portion of the top adjacent the at least one edge of the top. The table skirt may be secured by any suitable means including bolts, screws, mechanical fasteners, glues or adhesives and the like. Desirably, the table top and table skirt are formed of renewable materials such as wood. However, it is contemplated that the table skirt may be made of other materials such as, for example, aluminum, steel, and/or various plastics suitable for that purpose.

The method also includes providing a first pair and a second pair of support legs, each support leg having an outer face and an opposed inner face, a first side and an opposed second side, the first side and second side each being generally perpendicular to the outer face and inner face, a distal end, and a proximal end. Important aspects of the method include (i) defining a bevel having a predetermined angle on the distal end of each support leg; and (ii) defining a compound curve including at least a first curve with a first radius of curvature and a second curve with a second radius of curvature on the proximal end of each support leg. The first curve defines a notch in the outer face of the support leg substantially corresponding to the predetermined angle of the bevel, and the second curve has a midpoint and a center of curvature such that the proximal end of each support leg defines a pivot point located at least halfway between the midpoint and the center of curvature.

As noted above, it is believed that use of a compound curve allows for fast, reliable, economical and reproducible production of the support legs when such legs are manufactured by a cutting operation such as, for example, bandsaw, jigsaw cutting or the like. Importantly, fast, reliable and reproducible production of support legs may be particularly important for economical batch production of the support legs in a wood shop or other small manufacturing settings. It is believed the use of the compound curve at the proximal end of each support leg provides an economical and easy to manufacture component from readily available and renewable materials such as wood. It is also contemplated that the support legs may be manufactured from other materials such as, for example, aluminum, steel, and/or various plastics suitable for that purpose. For example, the support legs may be formed from extruded aluminum with the compound curve formed on the distal end. It is also contemplated that the compound curve may be formed as a separate section (from the same material or from one or more different material) and joined to or integrated into or onto the support leg.

The method includes forming a first leg assembly using the first pair of support legs and a connecting brace and forming a second leg assembly using the second pair of support legs and a connecting brace. Another step in the method includes pivotably connecting each support leg of the first leg assembly at its pivot point to the table skirt near the top first end and pivotably connecting each support leg of the second leg assembly at its pivot point to the table skirt near the top second end. The support legs may be pivotably connected using mechanical fastening means such as bolts, dowel rods or pins, or similar fasteners.

As one example, a portable cutting table was manufactured in accordance with the present invention. The table included a top that is approximately 24 inches wide and about 35.5 inches long or approximately 5.92 square feet (about 852 square inches). The table stands about 29 inches high when deployed. The skirt secured to the lower portion of the top has a width of 22.75 inches wide and a length of 33.5 inches. The support legs are approximately 27.5 inches long and have a bevel of approximately 13 degrees at the distal end so the legs deploy at an angle of 103 degrees from the plane of the top. The top is formed form repurposed bowling lane materials and is approximately five-eighths of an inch in thickness. The skirt and legs were formed from dimensional softwood lumber (common southern yellow pine) planed to a thickness of 1.5 inches and a width of 3.5 inches. The table also included hardware in the form of a metal handle on one face of the skirt that extended beyond the edge of the top as well as a bottle opener and knob on an opposite face of the skirt—also extending beyond the edge of the top. When assembled, the table weighed approximately 32 pounds (about 512 ounces), including the hardware, providing a weight to table top surface area ratio of approximately 5.4 pounds per square foot (about 0.6 ounces per square inch). Locating the pivot point approximately halfway between the midpoint "M" and the center of curvature "C2" on each support leg increases the effective length of each support leg by about 1 inch. This configuration allows the table legs to nest in the storage position that is about 2 inches shorter than conventional legs (i.e. having a pivot point located at approximately the center of curvature). Shortening the length of the 24-inch wide top by two inches (i.e., from 37.5 inches to 35.5 inches) reduces the surface area of the top by about 48 square inches. This reduction in surface area of the top as well as a corresponding reduction in the length of the table skirt secured underneath the top corresponds to a weight reduction of almost 2 pounds.

As another example, a different portable cutting table was manufactured according to the present invention. This table included a top that is approximately 24.75 inches wide and about 42 inches long or approximately 7.2 square feet (about 1040 square inches). The table stands about 36 inches high when deployed (e.g., conventional counter height). The skirt secured to the lower portion of the top has a width of 22.75 inches wide and a length of 39.5 inches. The support legs are approximately 34 inches long and have a bevel of approximately 13 degrees at the distal end so the legs deploy at an angle of 103 degrees from the plane of the top. The top is formed form repurposed bowling lane materials and is approximately five-eighths of an inch in thickness. The skirt and legs are formed from dimensional hardwood lumber (e.g. common southern yellow pine) planed to a thickness of 1 inch and a width of 3 inches. The table included hardware in the form of a metal handle on one face of the skirt that extended beyond the edge of the top as well as a bottle opener and knob on an opposite face of the skirt—also extending beyond the edge of the top. The portable cutting table also included a pull-out element mounted on the bottom portion of the top using "soft close" drawer mounts. The pull-out element weighed approximately 4 pounds.

When assembled, the table weighed approximately 38 pounds (about 608 ounces)—including the hardware but not including the weight of the pull-out element—providing a weight to surface area ratio of approximately 5.2 pounds per square foot (about 0.58 ounces per square inch) for the table components including the hardware but excluding the pull-out element. Locating the pivot point approximately halfway between the midpoint "M" and the center of curvature "C2" on each support leg increases the effective length of each support leg by about 1.5 inch. This configuration allows the table legs to nest in the storage position that is about 3 inches shorter than conventional legs (i.e. having a pivot point located at approximately the center of curvature). Shortening the length of the 24.75-inch wide top by three inches (i.e., from 45 inches to 42 inches) reduces the surface area of the top by about 74.25 square inches. This reduction in surface area of the top as well as a corresponding reduction in the length of the table skirt secured underneath the top corresponds to a weight reduction of almost 3 pounds. —

As can be understood from these two examples, the present invention provides a simple and effective portable table made from dense materials suitable yet having reduced weight while also providing a stable and robust surface at a convenient height for cutting and preparing meats, vegetables and the like for cooking at events like barbeques, cooking competitions, large outdoor gatherings, garden parties, tailgate events or similar outdoor or indoor venues.

Thus, exemplary embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not intended to be considered limitations. Directional terms such as left, right, front or rear are provided to assist in the understanding of the invention and are not intended to be considered as limitations.

While particular embodiments of the present invention have been described herein; it will be apparent to those skilled in the art that alterations and modifications may be made to the described embodiments without departing from the scope of the appended claims.

The invention claimed is:

1. A portable table comprising:
   a cutting top including an upper portion and a lower portion, a first end and a second end, and at least one edge;
   a table skirt secured to the lower portion of the top adjacent the at least one edge of the top,
   a first leg assembly and a second leg assembly, each leg assembly including a pair of support legs, each support leg having:
   an outer face and an opposed inner face,
   a first side and an opposed second side, the first side and second side each being generally perpendicular to the outer face and inner face, a distal end defining a bevel having a predetermined angle, and a proximal end defining a compound curve including at least a first curve with a first radius of curvature and a second curve with a second radius of curvature, the first curve defining a notch in the outer face of the support leg substantially corresponding to the predetermined angle of the bevel, and the second curve having a midpoint and a center of curvature such that the proximal end of each support leg defines a pivot point located at least halfway between the midpoint and the center of curvature, each support leg of the first leg assembly being pivotably connected at the pivot point to the table skirt near the top first end and each support leg of the second leg assembly being pivotably connected at the pivot point to the table skirt near the top second end.

2. The table of claim 1 wherein the table has a storage position, the first leg assembly and the second leg assembly nest together against the lower portion of the top when the table is in the storage position.

3. The table of claim 2, wherein the table has a deployed position, the first leg assembly and the second leg assembly deploy to an angle relative to the top that is approximately the sum of ninety degrees and the predetermined angle when the table is in the deployed position.

4. The table of claim 2, wherein the first leg assembly and the second leg assembly each include a connecting brace and the second leg assembly includes notches on its outer face to receive the connecting brace of the first leg assembly when the table is in the storage position.

5. The table of claim 1 wherein the table skirt includes a pull-out element secured to the lower portion of the top.

6. The table of claim 5, wherein the pull-out element is a pull-out shelf.

7. The table of claim 1, wherein the table skirt defines a first side element and a second side element extending between the first end and the second end of the top, the first side element and the second side element secured to the lower portion of the top adjacent the at least one edge of the top, each side element including hardware that extends beyond the at least one edge of the top.

8. The table of claim 1, wherein the cutting top is from about 4 square feet to about 8 square feet in area.

9. A method of making a table comprising:

providing a top including an upper portion and a lower portion, a first end and a second end, and at least one edge;

providing a table skirt and securing the table skirt to the lower portion of the top adjacent the at least one edge of the top;

providing a first pair and a second pair of support legs, each support leg having an outer face and an opposed inner face, a first side and an opposed second side, the first side and second side each being generally perpendicular to the outer face and inner face, a distal end, and a proximal end;

defining a bevel having a predetermined angle on the distal end of each support leg;

defining a compound curve including at least a first curve with a first radius of curvature and a second curve with a second radius of curvature on the proximal end of each support leg wherein the first curve defines a notch in the outer face of the support leg substantially corresponding to the predetermined angle of the bevel, and the second curve has a midpoint and a center of curvature such that the proximal end of each support leg defines a pivot point located at least halfway between the midpoint and the center of curvature, forming a first leg assembly using the first pair of support legs and a connecting brace and forming a second leg assembly using the second pair of support legs and a connecting brace; and pivotably connecting each support leg of the first leg assembly at its pivot point to the table skirt near the top first end and pivotably connecting each support leg of the second leg assembly at its pivot point to the table skirt near the top second end.

\* \* \* \* \*